United States Patent [19]
Kochocki

[11] Patent Number: 5,305,153
[45] Date of Patent: Apr. 19, 1994

[54] ANGULAR OPTICAL VIEWING DEVICE

[76] Inventor: Paul J. Kochocki, 2990 McKoon Ave., Niagara Falls, N.Y. 14305

[21] Appl. No.: 885,293

[22] Filed: May 18, 1992

[51] Int. Cl.$^5$ .......................... B60R 1/10; G02B 5/08; G02B 7/18
[52] U.S. Cl. .................................. 359/842; 359/859; 359/861; 359/871
[58] Field of Search ............... 359/850, 855, 857, 872, 359/546, 548, 550, 627, 631, 633, 636, 842, 858, 859, 861

[56] References Cited

U.S. PATENT DOCUMENTS

| | | | |
|---|---|---|---|
| 426,869 | 4/1890 | Simon | 359/857 |
| 2,165,736 | 7/1939 | Twele | 359/861 |
| 3,019,689 | 2/1962 | Paulsrud | 359/857 |
| 4,375,316 | 3/1983 | Le Vantine | 359/842 |
| 4,679,916 | 7/1987 | Roller et al. | 359/879 |
| 5,087,116 | 2/1992 | Taylor, II | 359/857 |

FOREIGN PATENT DOCUMENTS

| | | | |
|---|---|---|---|
| 0743180 | 3/1933 | France | 359/859 |
| 0482200 | 5/1954 | Italy | 359/858 |
| 0535474 | 5/1958 | Italy | 359/858 |
| 0003058 | of 1903 | United Kingdom | 359/858 |

Primary Examiner—Bruce V. Arnold
Assistant Examiner—R. D. Shafer
Attorney, Agent, or Firm—Wallace F. Neyerlin

[57] ABSTRACT

An angular viewing device is taught which enables the viewer to see, while looking downward, objects and scenery in front of him, to the right and left and also above and below the horizontal plane of the viewer's eyes. The viewing device and all of its reflective surfaces or mirrors are housed in a casing which is waterproof and also highly aerodynamically wind-resistant. The device is primarily for use as an optical visual aid for mounting on the handle bars of bicycles for forward vision purposes, safety, and easing of muscle strain associated with riding certain types of bicycles, such as English racer types.

12 Claims, 12 Drawing Sheets

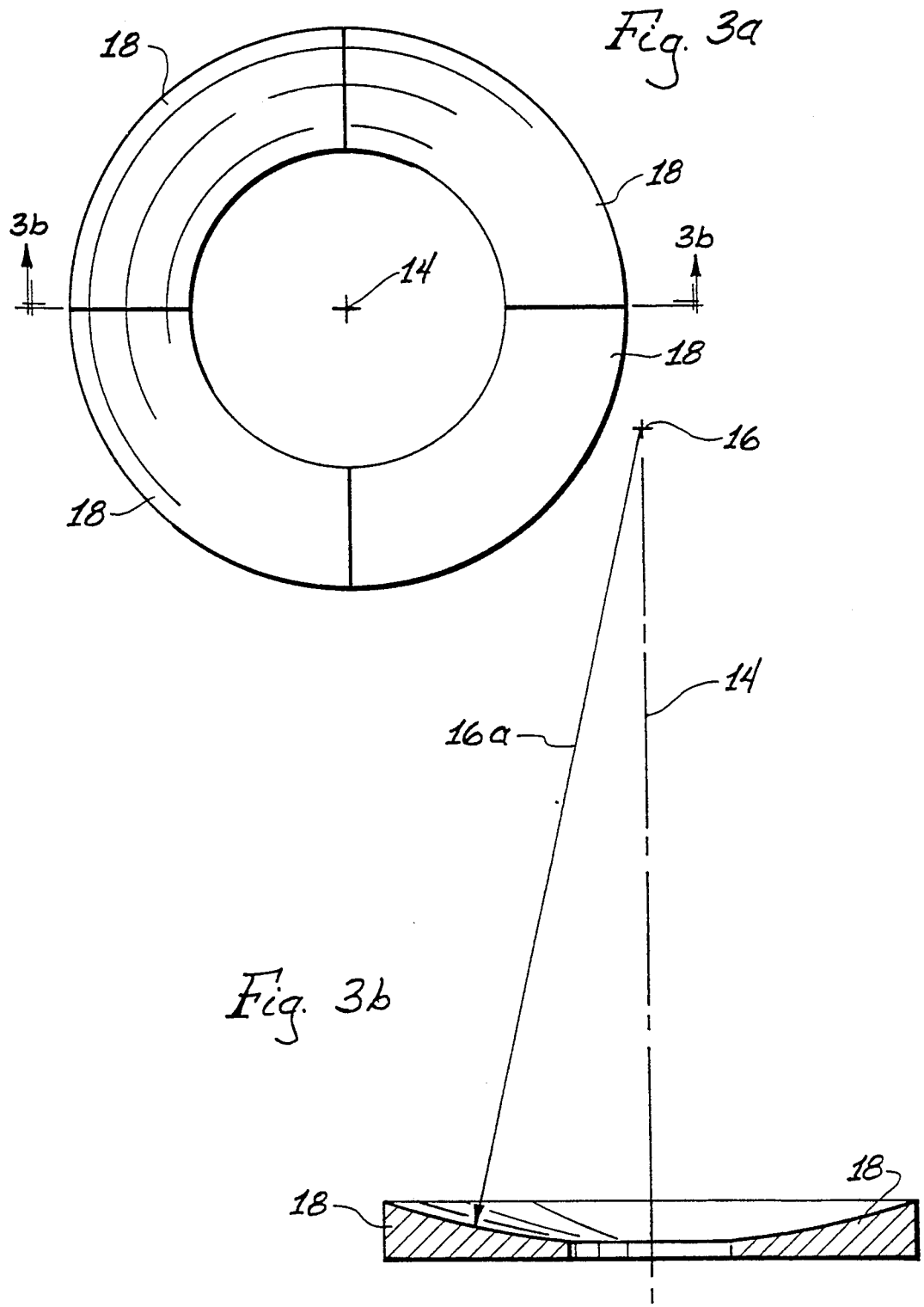

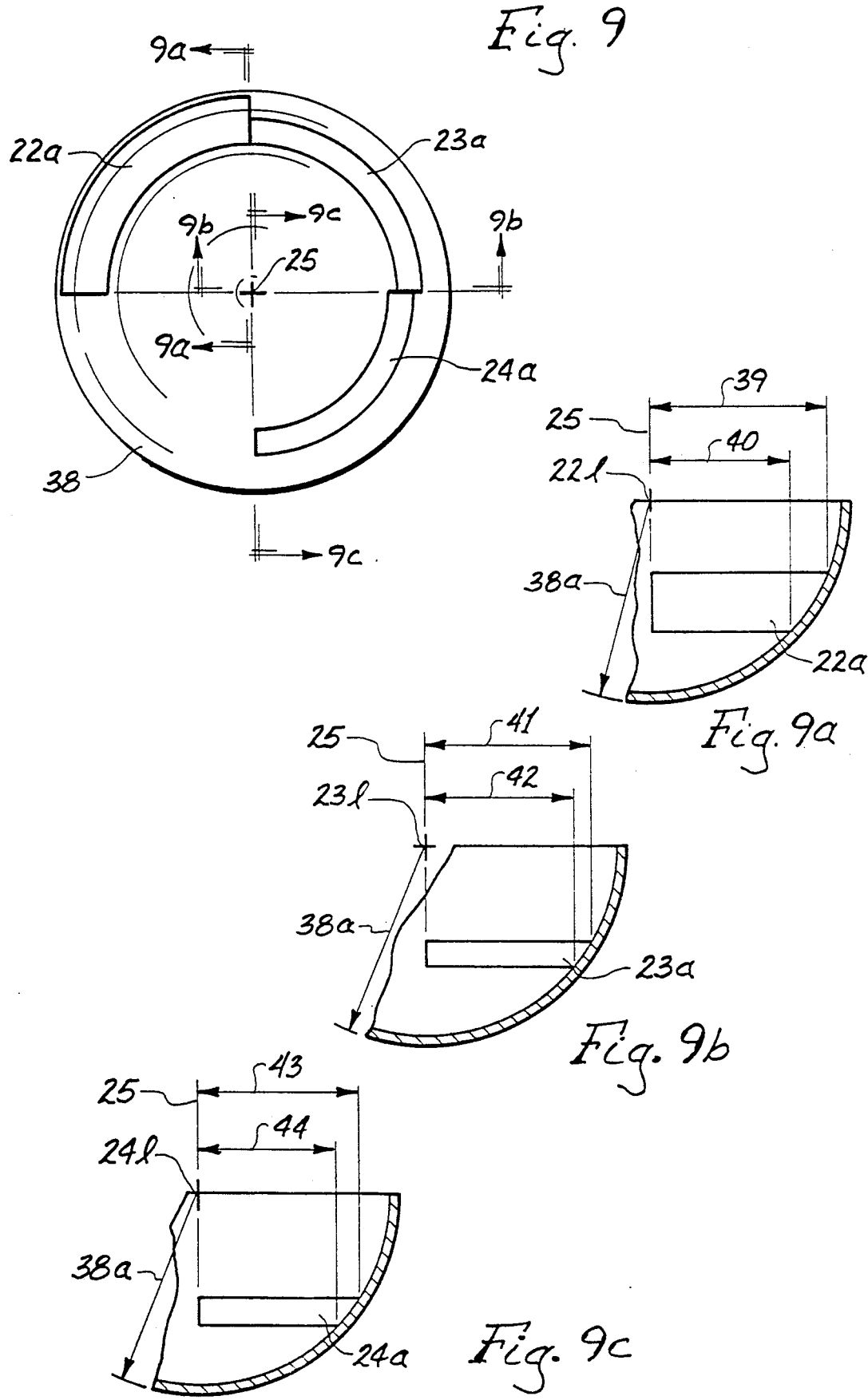

ANGULAR OPTICAL VIEWING DEVICE

BACKGROUND OF THE INVENTION

1. Field of the Invention

The concept of the invention relates to a viewing device, primarily for use on bicycles, but not restricted thereto. It consists of an arrangement of mirrors contained within a housing of special design. The arrangement of mirrors provides an "image corrected" view of objects in front of it while the observer e.g. bicycle rider is looking down through it. The device is for front-viewing and side viewing rather than rear viewing. On a bicycle, the housing is typically adjustably mounted on the handle bars, preferably with a vibration dampening mount. It is also preferably easily removable from the handle bars to help protect against theft.

2. Description of the Related Art

A search in the U.S. Patent Office was carried out and the following patents were found:

| U.S. Pat. No. | Issue Date | Inventor | Title |
| --- | --- | --- | --- |
| 1,748,837 | 2/25/1930 | E. L. Greensfelder | Device For Viewing Objects Above and Ahead of Automobiles |
| 1,918,802 | 7/18/1933 | R. R. Fleischer | Mirror Attachment For Motor Vehicles |
| 4,375,316 | 3/1/1983 | A. D. LeVantine | Forward View Mirror For Bicycles |
| 4,679,916 | 7/14/1987 | R. A. Roller | Optical Viewing Apparatus with Two Mirrors Consecutively Reflecting The Line of Sight |

Although the above patents found in the search are somewhat relevant to the optical viewing device of the present invention, they are not considered to be anticipatory thereof, particularly with regard to several specific aspects of the device of the present invention.

The Greensfelder patent is for a device for viewing objects above and ahead of automobiles including a planar mirror in series with a convex mirror, with the mirrors being adjustable to adjust what may be viewed by the user thereof. However the mirrors are separated rather than both being contained within a housing of special design.

The Fleischer patent is also for a device for viewing ahead of automobile (but below the normal line of sight rather than above same) and also includes a planar mirror in series with a convex mirror, with the mirrors being adjustable. Like the Greensfelder patent, however, the mirrors are separated rather than both being contained within a housing of special design.

The Le Vantine patent teaches the combination of a viewing device for use by bicyclists to view ahead, including a plurality of reflecting devices, i.e. flat mirrors and prisms. However, the patent fails to teach an arrangement of mirrors contained within a housing of special design.

The Roller patent teaches a device which is intended to be worn by the bicyclist, rather than being mounted upon the handlebars of the bicycle. It also fails to teach an arrangement of mirrors contained within a housing of special design.

SUMMARY OF THE INVENTION

The present invention teaches a novel angular optical viewing device which enables the viewer to see, while looking downward, objects and scenario in front of him, but not only in front of him, but also to the right and left and also above and below the horizontal plane of the viewer's eyes.

Another objective accomplished by the present invention is the housing of the viewing device and any and all of its reflective surfaces or mirrors in a casing of special design, said casing also being water-proof and also highly aerodynamically wind-resistant.

Another object of the present invention is the design of an angular optical viewing device which accomplishes the above purposes and/or objectives and which also enables the user to adjust the reflective surfaces of the viewing device (by adjusting the unit as a whole) while at the same time maintaining the water-proofness of the device.

The primary object of the device is for use as an optical visual aid to be used on bicycles for forward vision purposes, safety, and easing of muscle strain associated with riding certain types of bicycles, such as English racer types. However, the device (with appropriate dimensional scale-up) can also be used on boats; construction equipment, such as on cranes; cars; airplanes; sporting equipment; and on farm equipment, such as tractors; etc.

The invention and its operation and its advantages can best be described and understood by reference to the following drawings and the text materials describing same.

BRIEF DESCRIPTION OF THE DRAWINGS

FIG. 3a is a top view of a "bowl" mirror which can be utilized for preparing several secondary mirrors for the optical device of FIGS. 2 and 3;

FIG. 3b is a cross-sectional view taken across the line 3b—3b of FIG. 3a;

FIG. 3b is a cross-sectional view of the front window of FIG. 3g, taken across the line 3h—3h of same;

FIG. 9 is a top view of a "ball" mirror which can be utilized for preparing several primary mirrors for the multi-mirror optical device of FIGS. 4 and 5;

FIG. 9a is a cross-section of a mirror taken across line 9a—9a of FIG. 9;

FIG. 9b is a cross-section of a mirror taken across line 9b—9b of FIG. 9;

FIG. 9c is a cross-section of a mirror taken across line 9c—9c of FIG. 9;

These drawings and their components and features are now described in more detail.

DETAILED DESCRIPTION OF THE DRAWINGS AND OF THE PREFERRED EMBODIMENTS

Figure 1:
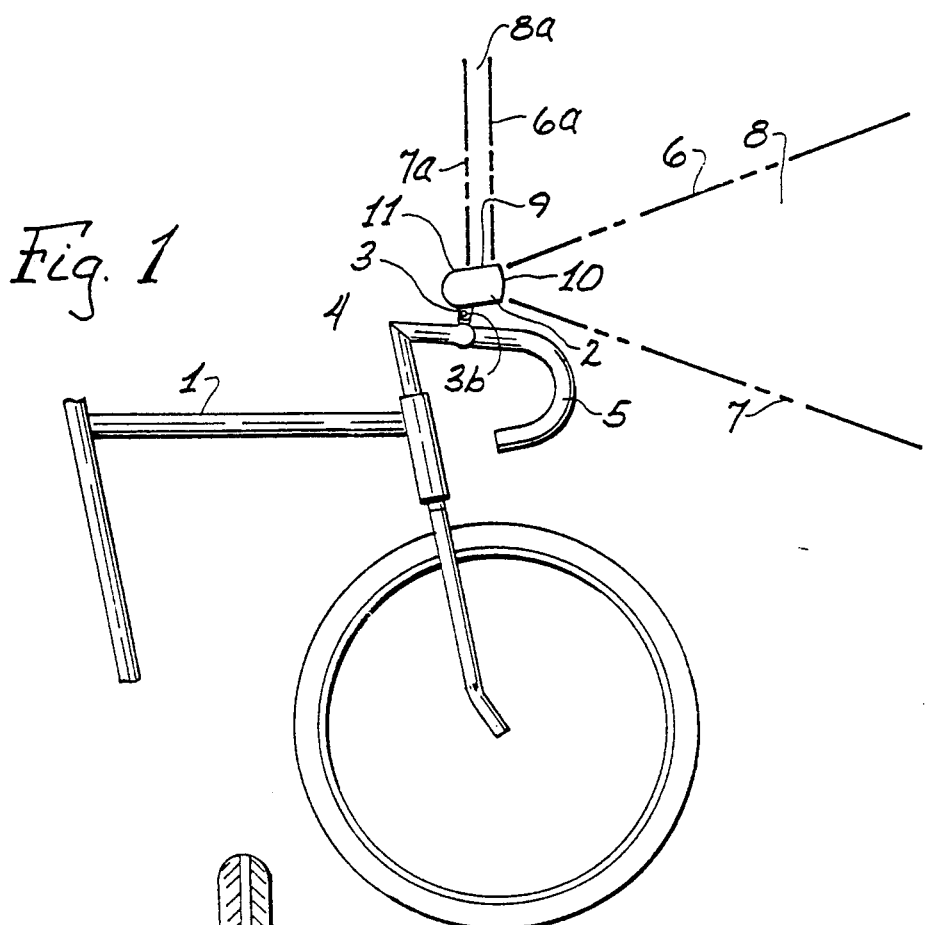
FIG. 1 is a side perspective view of a bicycle and the device showing the angular optical viewing device of the present invention mounted on the handlebars of a bicycle; illustrating also the typical vertical range of vision ahead of the bicyclist above and below the plane of the viewing device.

In FIG. 1, the bicycle is indicated by the numeral 1, the viewing device by the numeral 2, the mounting bracket for the device by 3, a pivot joint for adjusting the device by 3b, the frame stem by 4, and the handle bars by 5. The housing of the viewing device is indicated by numeral 11 and this housing is somewhat cubical in shape but with rounded or curved aerodynamic surfaces and constructed of weather resistant material, such as a shatter resistant plastic. The housing has a top transparent window 9 and a front transparent window 10.

Figure 3:
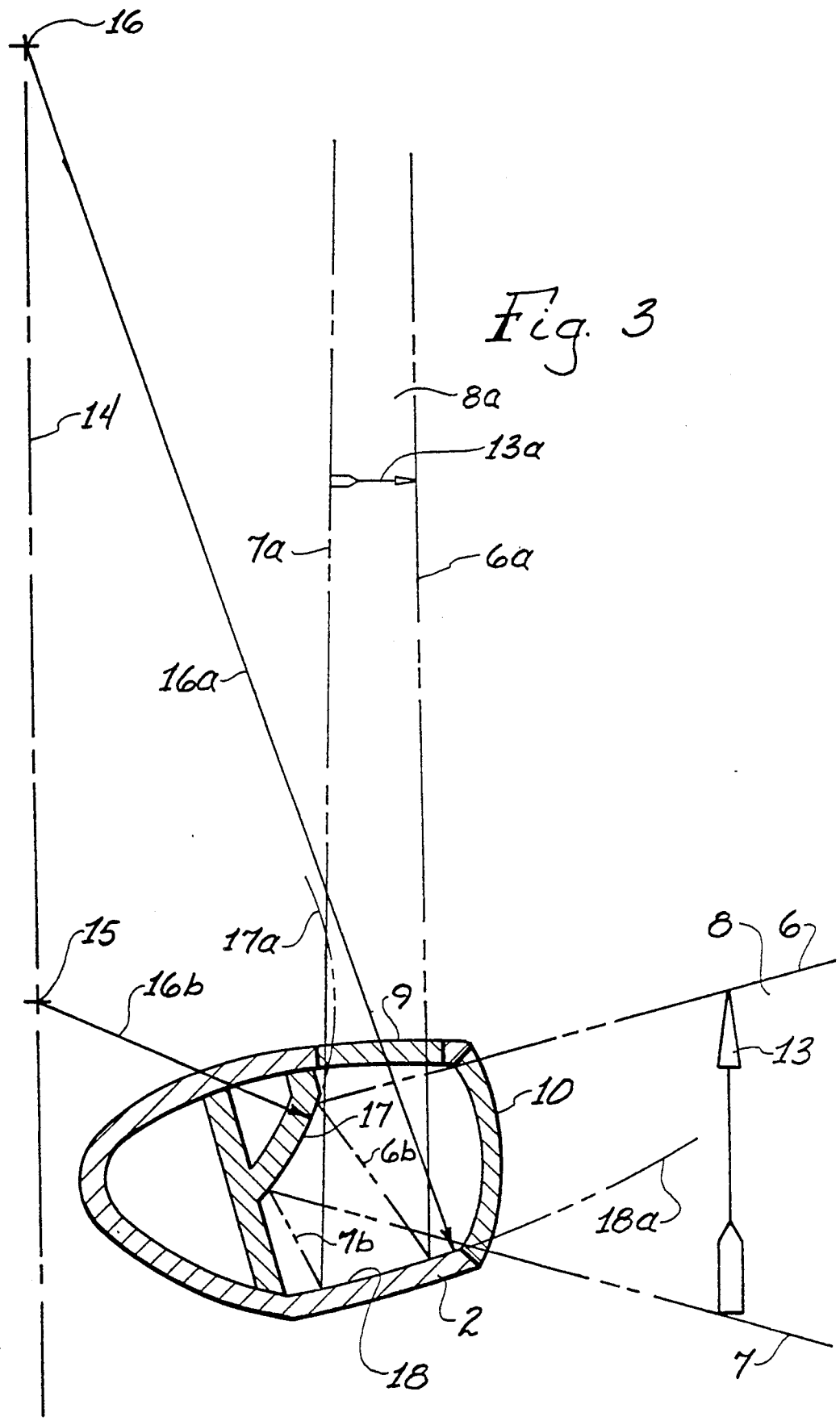
FIG. 3 is a cross-sectional side view of the viewing device of FIG. 2, illustrating various components of the device and the relationship of these components to the bicyclist's range of vision in the vertical direction.

The inside of the viewing device of FIG. 1 is as illustrated in FIG. 3 which unit possesses a primary mirror 17 and a secondary mirror 18. The top portion of primary mirror 17 reflects in the upper vertical limit of vision 6; and the bottom portion of primary mirror 17 reflects in the lower vertical limit of vision 7. Numeral 8 in both FIGS. 1 and 3 represents the vertical field of view and numberal 13 represents objects seen in the field of view.

The projected field of vision for the bicycle rider results from light rays 6b reflected from the top of primary mirror 17 onto the secondary mirror 18 and then upwardly as indicated by line 6a; and also from light rays 7b reflected from the bottom of primary mirror 17 onto secondary mirror 18 and then upwardly as indicated by line 7a. The net result of the placement or orientation of the mirrors and of the receipt and reflection of the light rays back to the bicycle rider is that he sees a reflected image 13a of object 13 in his projected field of view 8a between lines 6a and 7a. Although not illustrated, similar image receipt and reflections occur with respect to the bicycle rider's horizontal field of vision as to objects perceived and seen either on his left or on his right, as depicted in FIG. 2 which does show the horizontal field of view 12b separated by left limit of vision line 12 and right limit of vision line 12a.

Figure 2:
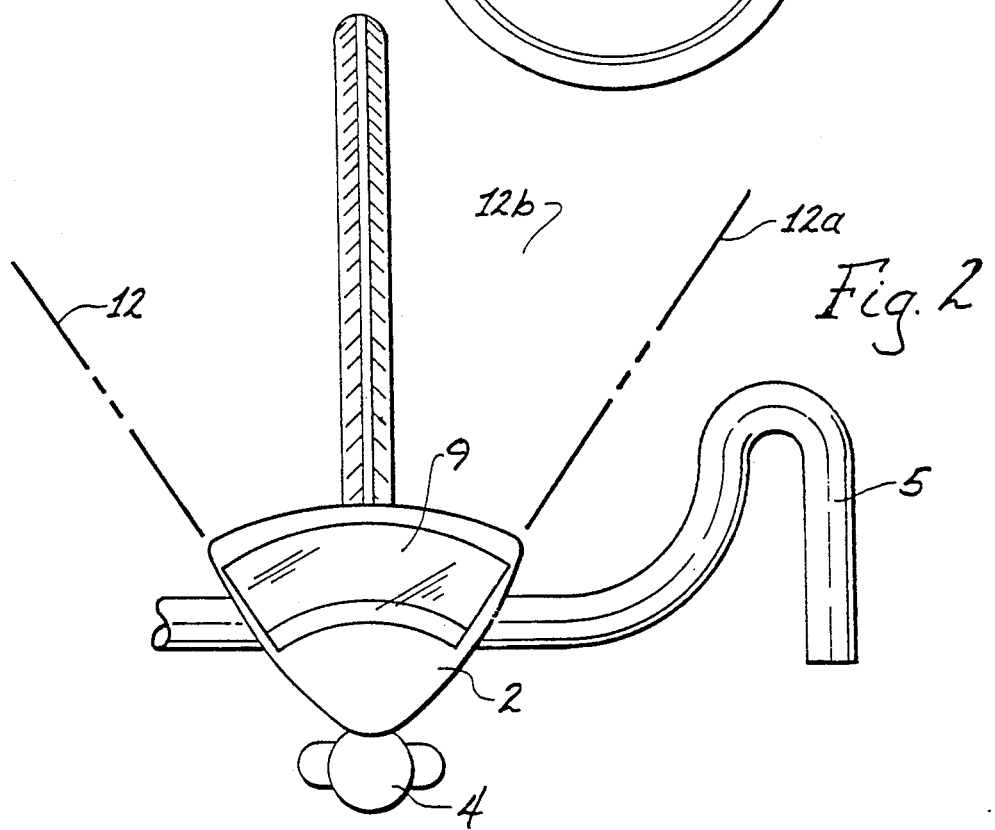
FIG. 2 is a top perspective view of one embodiment of the device illustrating the downward view of the bicyclist, and also the typical horizontal i.e. left and right range of vision of the bicyclist as he is riding, hunched over, for example, on an English racer type bike.

The extensive vertical and horizontal fields of view provided to the bicyclist by the image device of FIGS. 1, 2 and 3 is made possible by the fact that primary mirror 17 is convex and secondary mirror 18 is concave. The curvature of these mirrors is as illustrated in FIG. 3, wherein the curvature of mirror 17 is illustrated by arc 17a and the curvature of mirror 18 is illustrated by arc 18a. Numeral 14 designates the mirror radius centerline. Numeral 15 is the radius center for primary mirror 17 (or of a circle formed by arc 17a), and numeral 16 is the radius center for secondary mirror 18 (or of a circle formed by arc 18a). Line 16b denotes the radius of the circle formed by arc 17a; and line 16a denotes the radius of the circle formed by arc 18a.

As is illustrated in the Figures, the angular viewing device of FIGS. 1, 2 and 3, has two fixed spherical shaped mirrors in same, and these are complementary to each other. The primary convex front surface mirror 17 reflects light onto the secondary concave front surface mirror 18 and then to the viewer at approximately a 90° difference in angle of view as shown by the light lines in FIG. 3. The radii or radiuses of curvature and the positions of the radii or radiuses of curvature are important so as to achieve maximum or optimal visual effect. It is to be noted that the center point 16 of secondary radius of curvature (18a) is located directly above the center point 15 of primary radius of curvature (17a) of the primary mirror, whereas the locations and sizes of the radiuses are directly proportional to one another; and also that these features and relationships are to be accomplished in an aerodynamic optical device shell.

The perceived ranges of vision in both the vertical and horizontal directions are, of course, functionally related to the size and design of the optical viewing device.

FIGS. 3a and 3b illustrate a "bowl" mirror from which several concave secondary mirrors 18 can be cut or fabricated for production purposes of making the viewing device, line 16a depicting the spherical radius dimension for such a secondary mirror and point 16 depicting the radius center for such a secondary mirror.

Figure 3C:
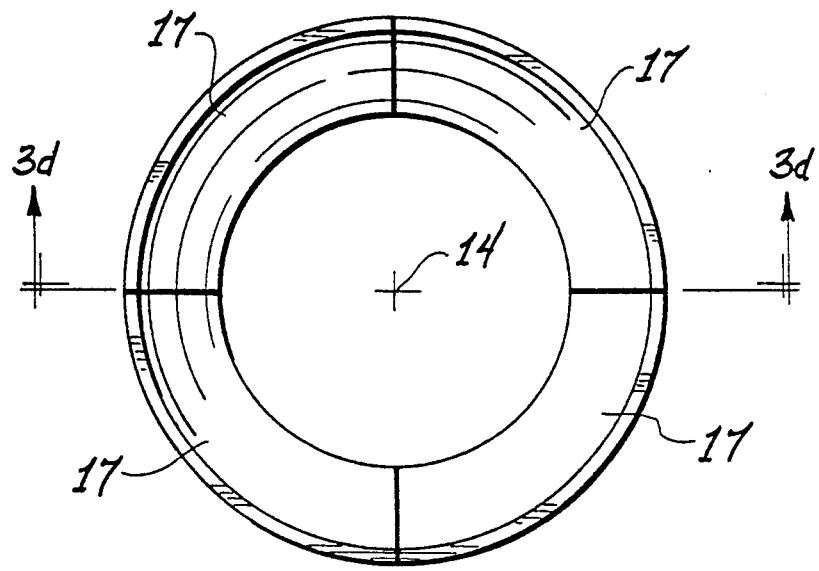
FIG. 3c is a top view of a "ball" mirror which can be utilized for preparing several primary mirrors for the optical device of FIGS. 2 and 3.
Figure 3D:
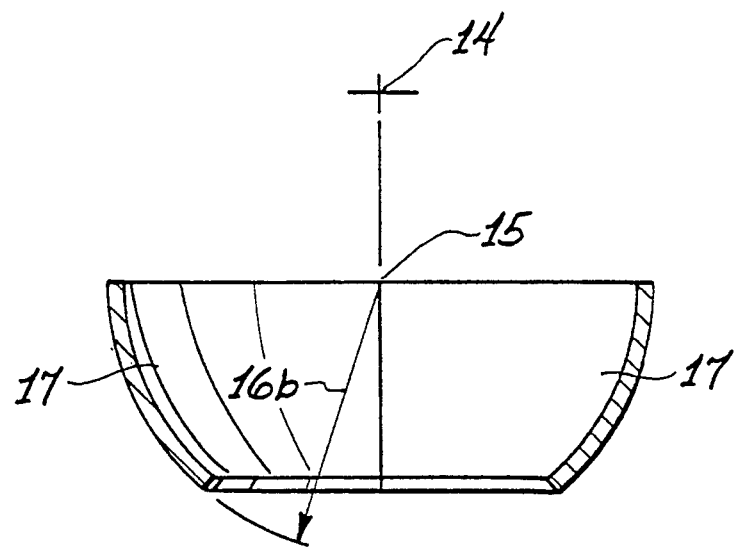
FIG. 3d is a cross-sectional view taken across the line 3d—3d of FIG. 3c.

FIGS. 3c and 3d illustrate a "ball" mirror from which several convex primary mirrors 17 can be cut or fabricated for production purposes of making the viewing device, line 16b depicting the spherical radius dimension for such a primary mirror and point 15 depicting the radius center for such a primary mirror.

Figure 3E:
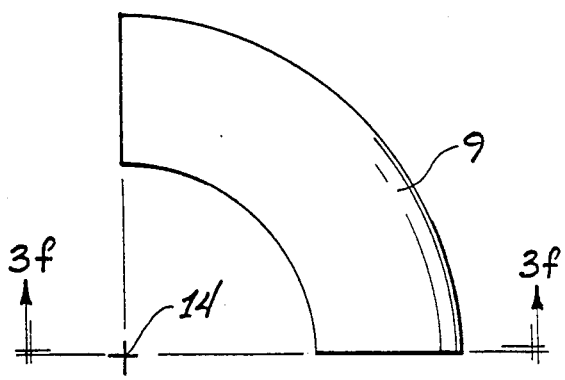
FIG. 3e is a top view of a top window for the device of FIGS. 2 and 3.
Figure 3G:
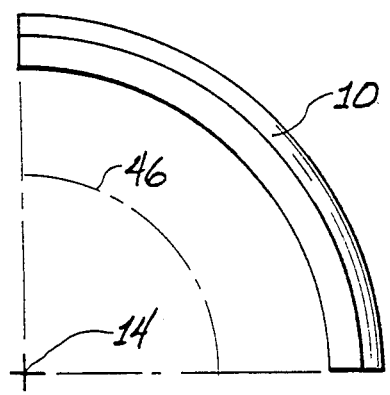
FIG. 3g is a top view of a front window for the device of FIGS. 2 and 3.
Figure 3F:
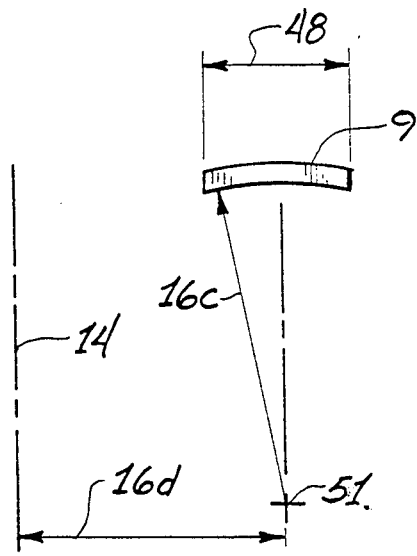
FIG. 3f is a cross-sectional view of the top window of FIG. 3e, taken across the line 3f—3f of same.
Figure 3H:
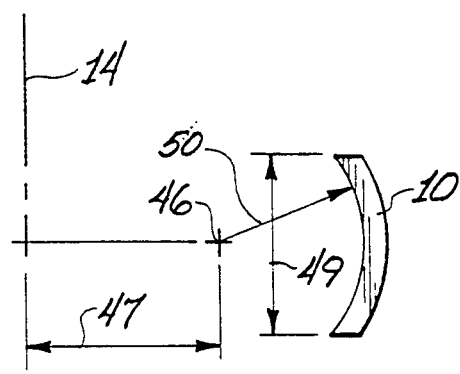

FIG. 3e is a top view of the top window 9 of the viewing device of FIG. 3 and FIG. 3f is a cross-section view of the top window taken across the line 3f—3f of FIG. 3e. As in FIGS. 3 and 3b, numeral 14 in these figures depicts the radius center line. Numeral 16c is the radius of the arc formed by 9 to center point 51. Numeral 16d depicts the offset distance of point 51 to the radius center line 14, thus suggesting the field of view which is achievable by looking down through the top window, complementing and coordinating with the fields of view achieved with the primary mirror 17 and the secondary mirror 18 as depicted in FIGS. 2 and 3;

FIGS. 3g and 3h are comparable to the foregoing, except that these relate respectively to the top view and the cross-sectional view of the front window 10, FIG. 3h being taken across line 3h—3h of FIG. 3g. Numeral 14 in these figures depicts the center line. Numeral 50 is the radius of the arc formed by 10 to center point 46. Numeral 47 depicts the offset distance of point 46 to the center line 14, thus also serving to coordinate and complement fields of view achievable by the viewing device in conjunction with the top window and the primary and secondary mirrors.

Numeral 48 in FIG. 3f depicts the width of top window 9; and numeral 49 in FIG. 3h depicts the height of front window 10.

The optical device of FIGS. 4, 5, 6 and 7 represent a different approach and a preferred angular optical device embodiment for accomplishing the objectives of the present invention. In this embodiment the viewing device is a multi-mirror multi-optical system or unit 19 shown with 3 sections A, B and C. Numeral 11a represents the housing for the unit, which possesses a front window 10a and a top window 9a which correspond to windows 10 and 9 respectively of the device of FIGS. 1-3. The mirror radius center line is depicted by numeral 25.

Figure 4:
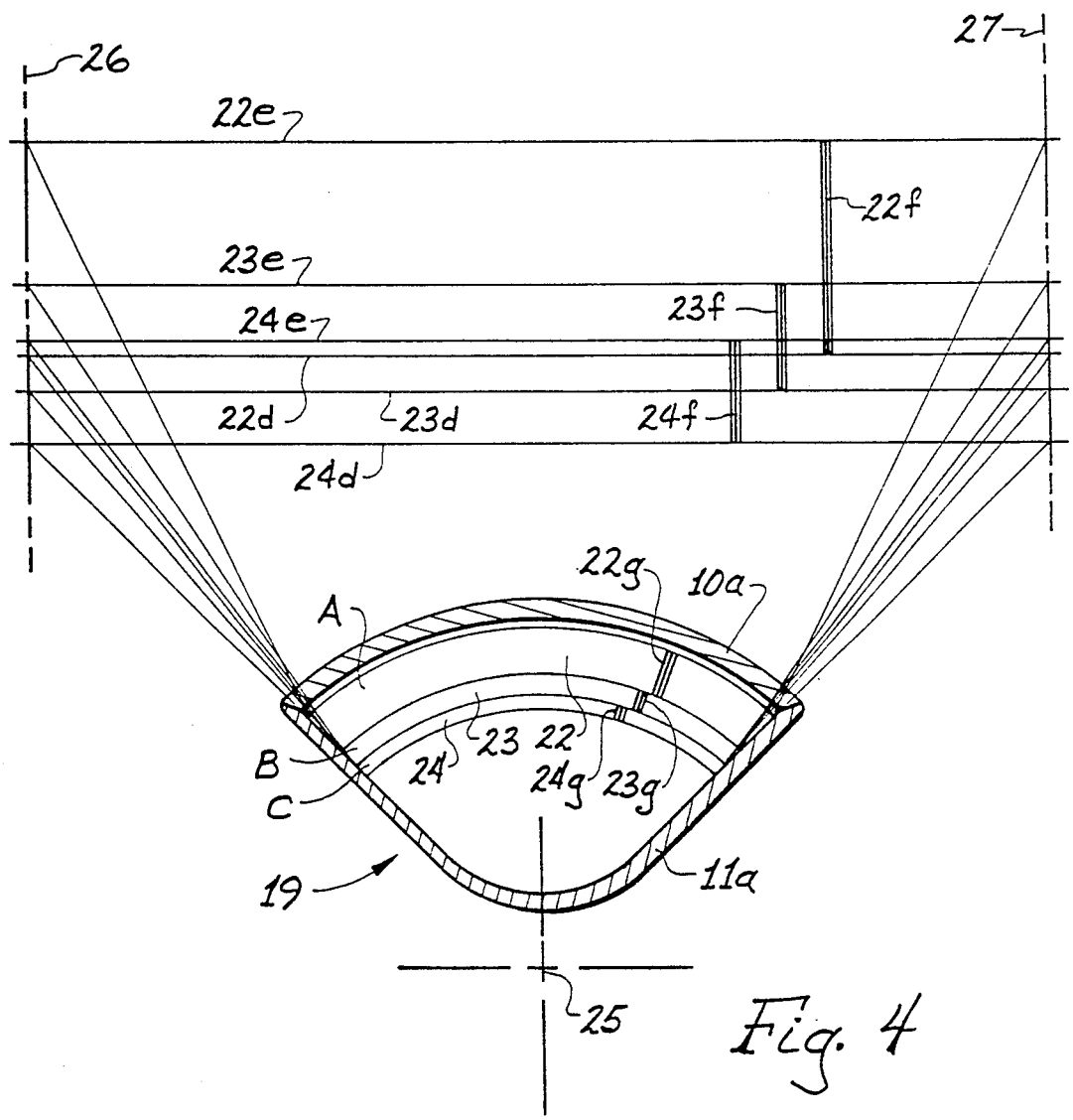
FIG. 4 is a top view of a different embodiment of the viewing device of the present invention utilizing a multi-mirror system and illustrating various components of the device and the relationship of these components to the bicyclist's lines or range of vision in both the horizontal and vertical directions.
Figure 5:
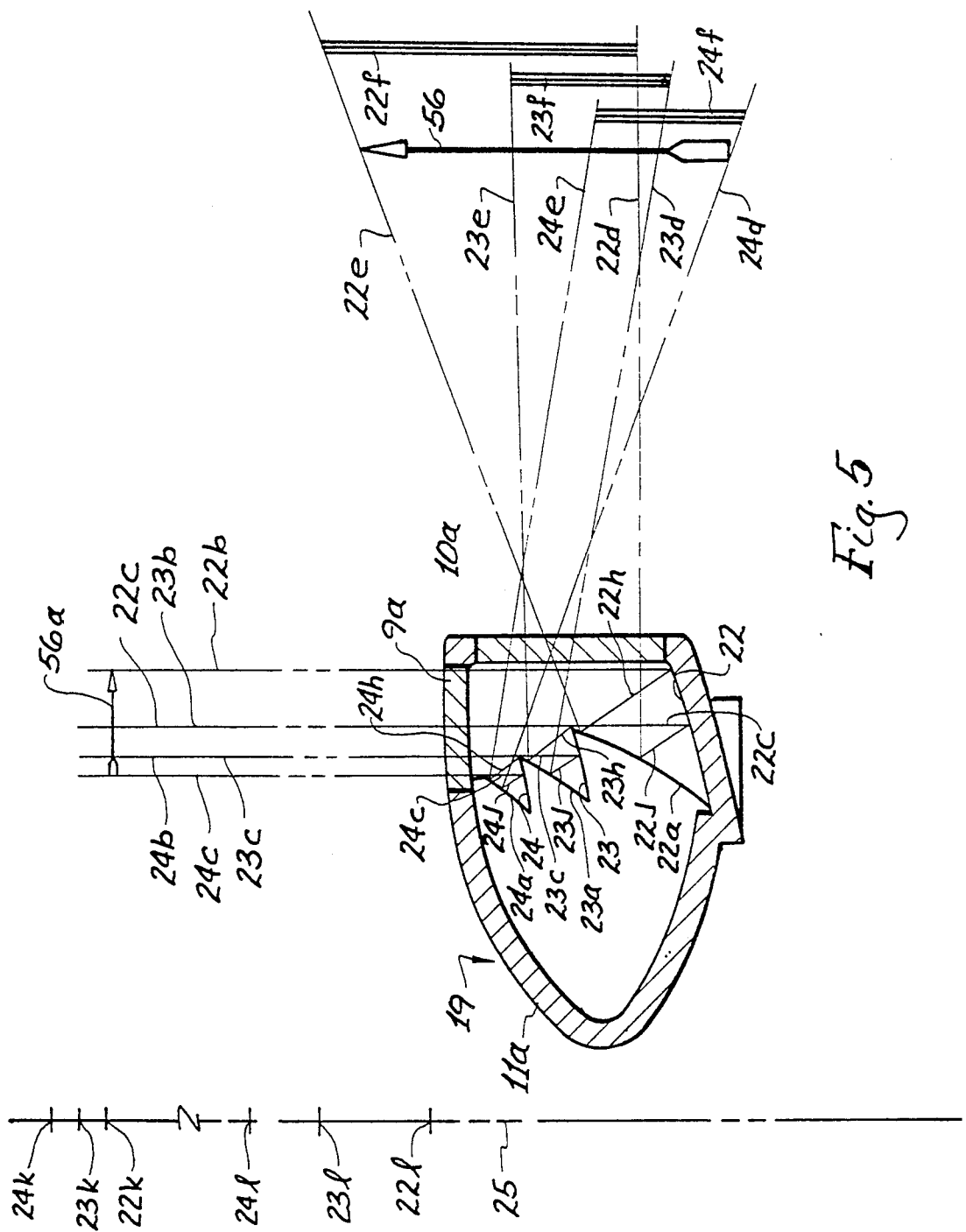
FIG. 5 is a cross-sectional side view of the device of FIG. 4 but also illustrating indicated lines of vision and radii and diameters of curvature of the mirrors used in same as these relate to the bicyclist's range of vision in the vertical direction.

As shown in FIGS. 4 and 5, the bicyclist looks down through top window 9a of FIG. 5 and sees the viewing sections A, B and C of FIG. 4. In FIG. 4, numeral 22 is the secondary mirror for section A; 23 is the secondary mirror for section B; and 24 is the secondary mirror for section C. The horizontal view achieved by the mirror arrangement shown is a 90° field of view as shown by left reference line 26 and right reference line 27. Objects depicted in the field of view are 22f, 23f and 24f as picked up by mirrors 22, 23 and 24; and reflected back to the bicycle rider as object images 22g, 23g and 24g, respectively. Numeral 22e depicts the upper vertical limit field of view of mirror 22, and 22d its lower limit vertical field of view; 23a and 23d are the upper and lower limit vertical field of view of mirror 23; and 24e and 24d are the upper and lower limit vertical field of view of mirror 24.

As shown in FIG. 5, upper limit 22e is approximately +20° and 22d is about 0°; 23e is about 0° and 23d is about −10°; and 24e is about −10° and 24d is about −20°.

With further specific reference to FIG. 5, numeral 22a is the primary mirror for section A, numeral 23a is the primary mirror for section B, and numeral 24a is the primary mirror for section C. Numeral 22b is the upper projected limit of the field of view of section A, 23b is the upper projected limit of the field of view of section B, and 24b is the upper projected limit of the field of view of section C. Numeral 22c is the lower projected limit of the field of view of section A, 23c is the lower projected limit of the field of view of section B, and 24c is the lower projected limit of the field of view of section C. Numeral 22d is the lower limit of vertical field of view for section A (0°), 23d is the lower limit of vertical field of view for section B (−10°) and 24d is the lower limit of vertical field of view for section C (−20°). Numeral 22e is the upper limit of vertical field of view for section A (+20°), 23e is the upper limit of vertical field of view for section B (0°), and 24e is the upper limit of vertical field of view for section C (−10°). Numerals 22f, 23f and 24f represent objects in front seen by the bicyclist in his field of view 56 and numerals 22g, 23g and 24g (FIG. 4) represent the images respectively of these objects as seen by the bicyclist in his reflected field of view 56a when looking down into the viewing device.

Numeral 22h represents the reflected upper limit for the mirror of section A, 23h the reflected upper limit for the mirror of section B, and 24h the reflected upper limit for the mirror of section C. Numeral 22j represents the reflected lower limit for the mirror of section A, 23j the reflected lower limit for the mirror of section B, and 24j the reflected lower limit for the mirror of section C.

Numeral 25 in FIGS. 4 and 5 is the viewing device radius center line, (said line being broken because of space limitation in the drawing), numerals 22k, 23k and 24k are the radius center lines for the secondary mirrors 22, 23 and 24 of sections A, B and C; and numerals 22L, 23L and 24L are the radius center lines for the primary mirrors 22a, 23a and 24a of sections A, B and C respectively.

Figure 6:
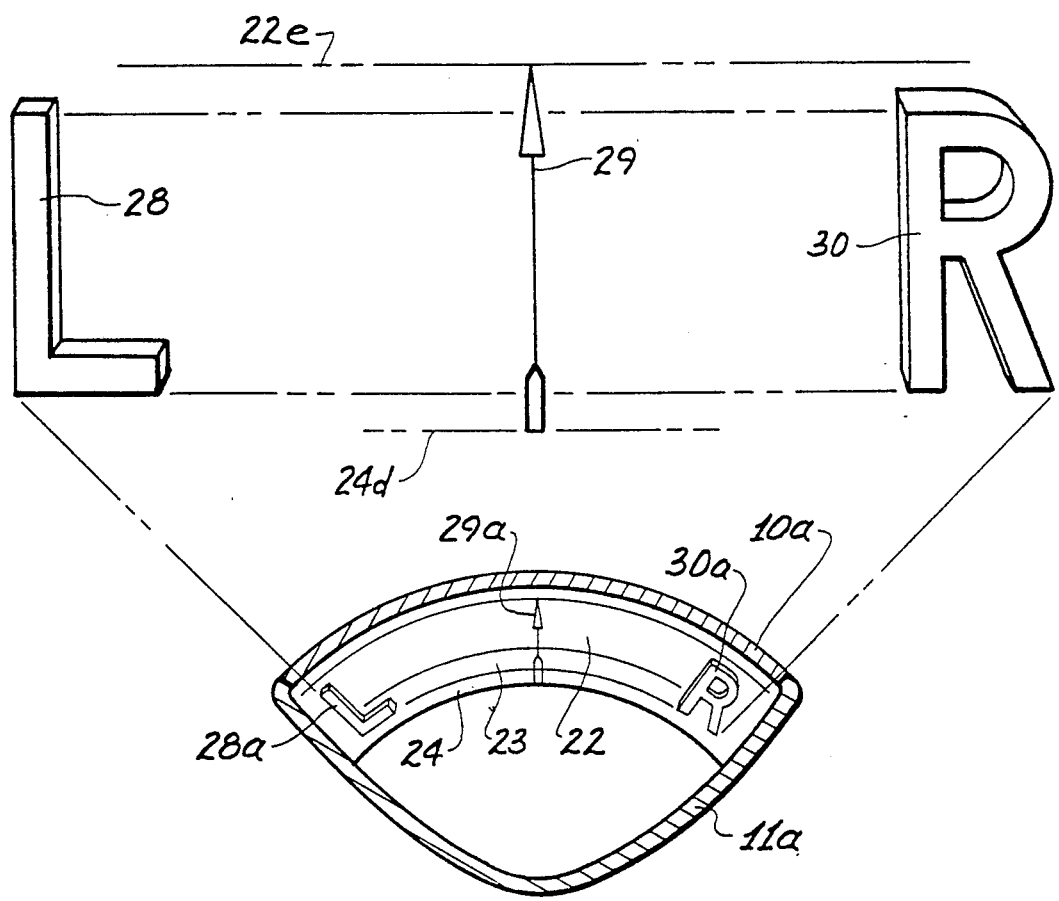
FIG. 6 is another top view of the device of FIG. 4 but illustrating external objects "L" and "R" and their images as seen in the device.

In FIG. 6, the upper and lower limits of the vertical field of view are again designated as 22e and 24d (as in FIG. 5), numeral 29 designates a center object in the field of view, numeral 29a a center image in the viewing device. Secondary mirrors 22, 23 and 24 are again designated as is front window 10a. Objects 28 and 30 in the field of view are shown as the capital letters L and R and these objects as seen in the viewing device are also shown as the capital letters L and R and designated by the numerals 28a and 30a.

Figure 7:
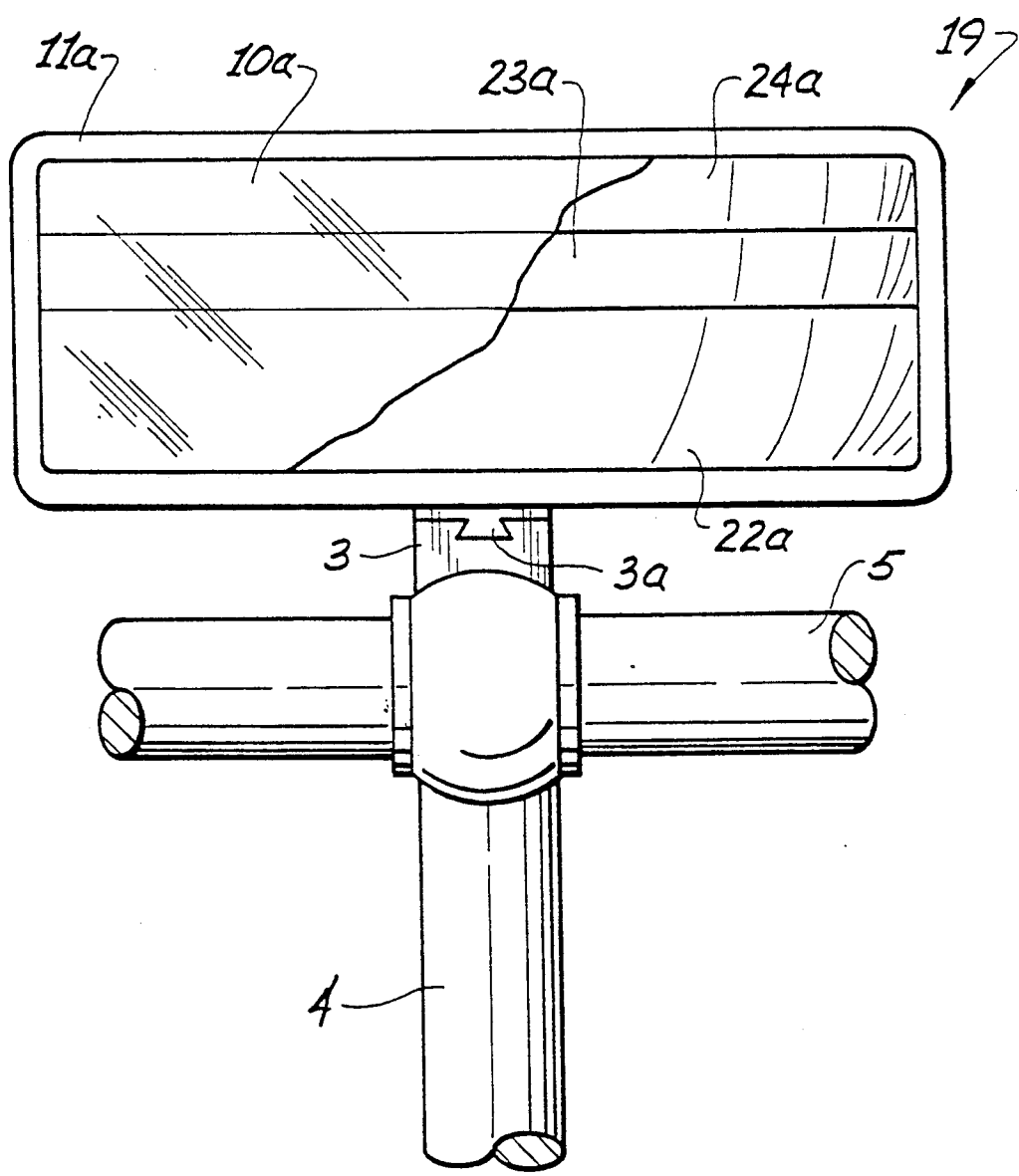
FIG. 7 is a front view of the device of FIG. 4 as mounted on a bicycle.

In FIG. 7, which shows the front view of the viewing device 19 mounted on a bike, numeral 11a designates the housing (aerodynamically shaped to minimize wind resistance), numeral 10a designates the front window, and numerals 22a, 23a and 24a designate the primary mirrors of sections A, B and C respectively. Numeral 4 designates the stem of the handle bars, numeral 3 the mounting bracket for the viewing device; and numeral 3a designates a "dovetail" fit for easily attaching the viewing device to the mounting bracket. It can then be firmly fixed in place by adjustment and tightening of pivot joint or bolt 3b, shown in FIG. 1; or similarly easily loosened and disengaged from the bicycle whenever desired by the bicyclist.

Figure 8:
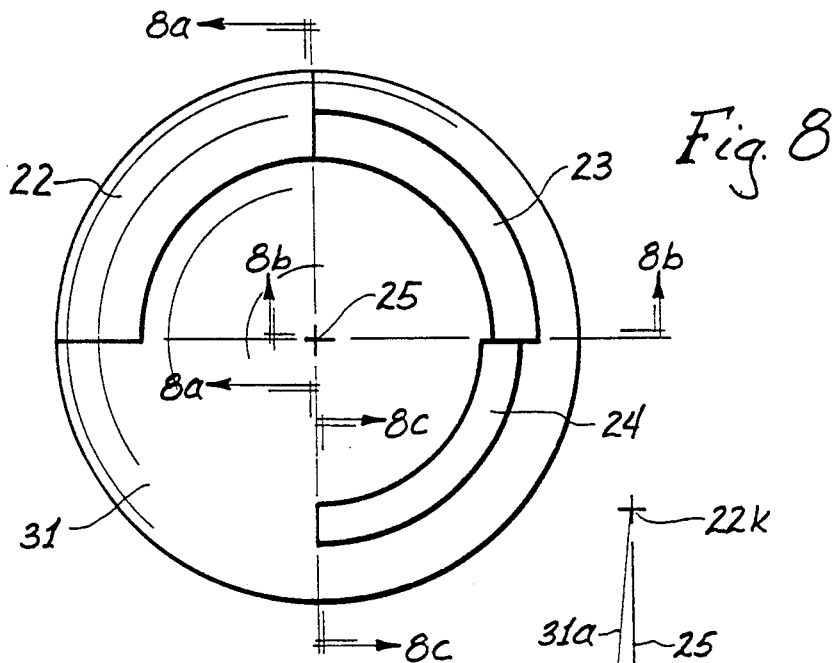
FIG. 8 is a top view of a "bowl" mirror which can be utilized for preparing several secondary mirrors for the multi-mirror optical device of FIGS. 4 and 5.
Figure 8A:
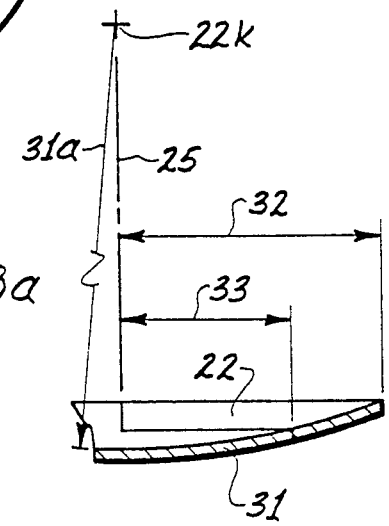
FIG.8a is a cross-section of a mirror taken across line 8a—8a of FIG. 8.
Figure 8B:
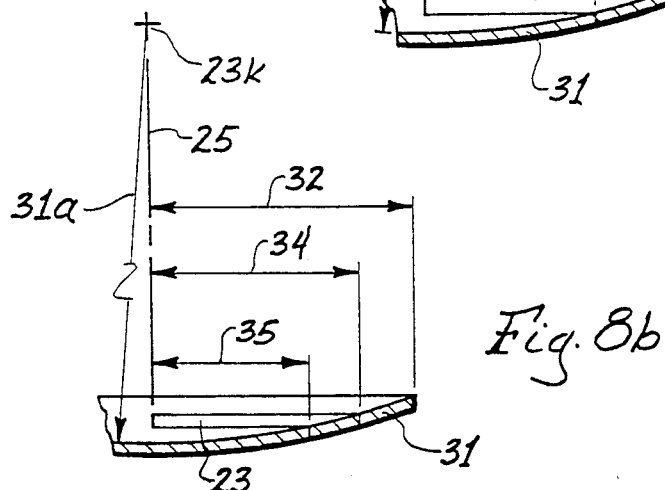
FIG.8b is a cross-section of a mirror taken across line 8b—8b of FIG. 8.
Figure 8C:
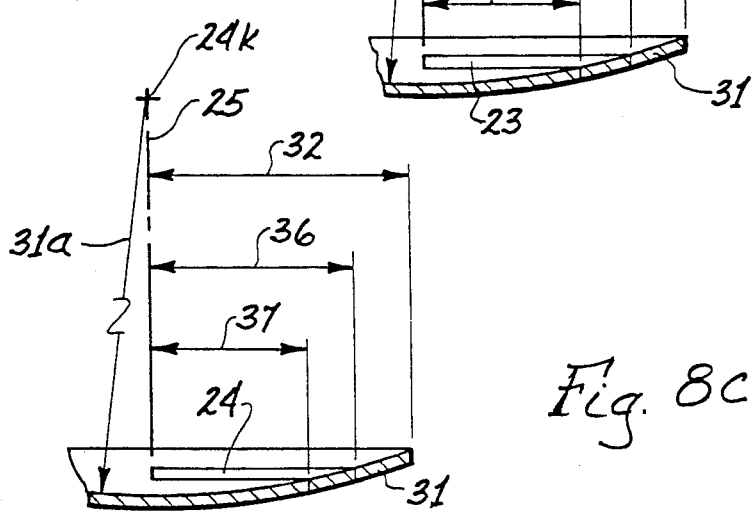
FIG.8c is a cross-section of a mirror taken across line 8c—8c of FIG. 8.

In FIG. 8, as previously indicated, numeral 25 denotes the mirror radius center line; and numerals 22, 23 and 24 denote secondary mirrors that can be cut or machined from the whole spherical "bowl" mirror 31. In FIGS. 8a, 8b and 8c, numerals 22k, 23k and 24k are the radius center lines for these secondary mirrors, respectively, of sections A, B, and C in FIGS. 4 and 5. Numeral 32 in each of these Figures denotes the distance from the outside edge of mirror 31 to center line 25 and numeral 31a denotes the inside spherical radius of bowl mirror 31. Numeral 33 in FIG. 8a denotes the inside radius of mirror 22. Numeral 34 in FIG. 8b denotes the outside radius of mirror 23 and numeral 35 its inside radius. Numeral 36 in FIG. 8c denotes the outside radius of mirror 24 and numeral 37 its inside radius.

In FIG. 9, as previously indicated, numeral 25 denotes the mirror radius center line; and numerals 22a, 23a and 24a denote primary mirrors that can be cut or machined from the whole spherical "ball" mirror 38. In FIGS. 9a, 9b and 9c, numerals 22L, 23L and 24L are the radius center lines for these primary mirrors, 22a, 23a and 24a respectively, of sections A, B and C in FIGS. 4 and 5. Numeral 38a in each of these figures denotes the outside spherical radius of mirror 38 (typically about 3 inches radius of curvature). Numeral 39 in FIG. 9a is the outside radius of mirror 22a of section A and numeral 40 is its inside radius. In FIG. 9b, numeral 41 is the outside radius of mirror 23a of section B and 42 is its inside radius. In FIG. 9c, 43 is the outside radius of mirror 24a of section C and 44 is its inside radius.

Figure 10:
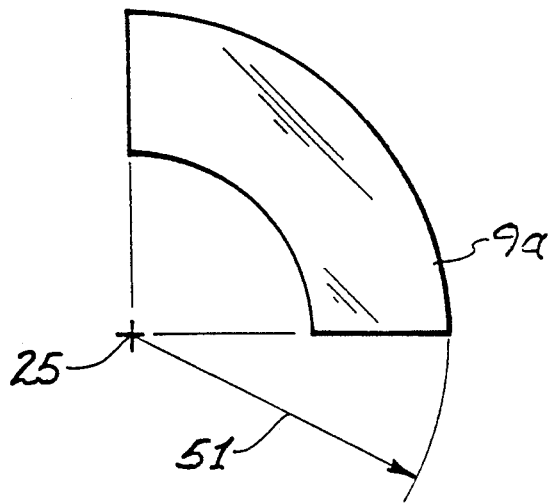
FIG. 10 is a top view of a top glass (9a) for the multi-mirror device.
Figure 10A:
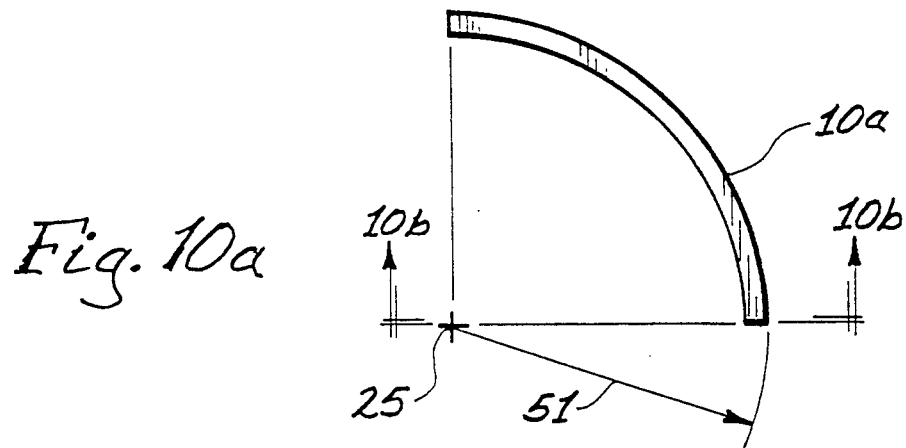
FIG. 10a is a top view of a front glass (10a) for the multi-mirror device.
Figure 10B:
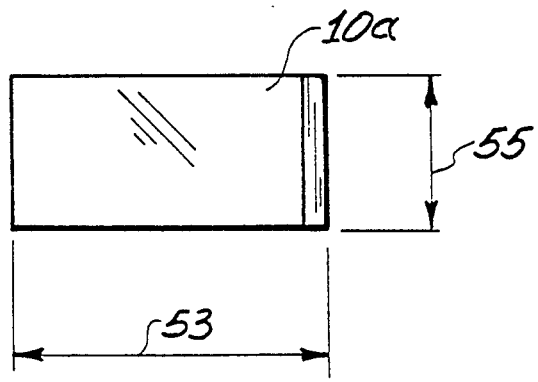
FIG. 10b is a side view of a front glass (10a) for the multi-mirror device.

In FIG. 10, the top view of the top glass 9a for the multi-mirror viewing device, numeral 51 is the radius of the arc formed by 9a to center point 25. In FIG. 10a, which is the top view of the front glass window 10a for the multi-mirror viewing device, numeral 51 is the radius of the arc formed by 10a to center point 25; and in FIG. 10b, the side view of the front glass 10a of the multi-mirror viewing device, numeral 55 depicts the height of the front glass 10a and numeral 53 denotes its radius dimension.

The design of the optical viewing devices of this invention, in single or multiple sections is not limited to the use of just spherically, (e.g. convex or concave) curved mirrors, but can also incorporate the use of, for example, ellipsoidal, hyperbolic, parabolic and/or irregular type mirror curvatures.

Other than spherical type curvatures can be used to customize the design efficiency of the viewing device; for example, for its aerodynamic shape, size, image size, image quality, field of view, and viewing angle.

In the multiple section optical system devices, different reflective curvatures and curvature sizes can be used in each optical system or section; also the multiple section optical systems are not limited to 3 optical sections per unit. A unit or device can consist of two or more optical systems.

The viewing device is also not limited to first surface reflective mirrors; however, first surface reflective mirrors are preferred. If second surface reflective mirrors were used, lenses, as in refractive curvatures could also be considered for use and could be made as part of the mirror or mirrors, and/or constructed as a separate piece or pieces. The use of refractive curvatures is not limited to only second surface mirror systems. Refractive curvatures could also be used in, as, or on, the top or front viewing windows of the device, to enhance (or to make more desirable image size, field or view, and/or viewing angle, and also to correct for any possible spherical type and/or chromatic type aberrations.

Lenses as in refractive curvatures could also be used on part or the whole of the viewing device; example—center field of view, bottom or top, left or right, etc.

Such refractive curvatures need not be permanently mounted on the front or top viewing windows, although they can be incorporated into the windows. Refractive curvatures, as separate pieces, can be added on or taken off as needed, or permanently attached to the windows to customize the viewing device.

Special optical coatings and films can also be applied to the mirrors and windows to increase or decrease light reflection, and transmission and to selectively transmit, intensify or omit, certain desired wave lengths or percentages thereof, and also to serve as a protective coating.

In certain contemplated uses of the device, an image can also be made to be focused on a screen and electronically enhanced.

While the present invention has been described and illustrated in detail, various modifications may be made by those skilled in the art. It is therefore to be understood that the invention is not to be limited to the details of construction described and illustrated and it is intended by the appended claims to cover all modifications which fall within the spirit and scope of the invention.

I claim:

1. An optical viewing device in combination with the handle bars of a bicycle upon which the device is mounted for enabling a bicycle rider observer when looking in a downward direction to view objects in front of him directly as they are rather than as reverse images and to broaden his field of view in both the horizontal and vertical directions, wherein the optical viewing device comprises curved complementary primary and secondary surfaces which are in or comprise a single casing, wherein said single casing includes possesses a top transparent window and a front transparent window, wherein incoming light rays enter the front transparent window and are received by a primary reflective curved surface and reflected to the secondary reflective curved surface and thence exit through the top transparent window of the viewing device as an image or as images of the objects in front of the bicycle rider.

2. The combination of claim 1 wherein the casing is adjustably mounted on the handle bars with a vibration dampening mount.

3. The combination of claim 1 wherein the casing is waterproof.

4. An optical viewing device in combination with the handle bars of a bicycle upon which the device is mounted for enabling a bicycle rider observer when looking in a downward direction to view objects in front of him directly as they are rather than as reverse images and to broaden his field of view in both the horizontal and vertical directions, wherein the optical viewing device comprises a plurality of curved complementary convex primary and concave secondary reflective surfaces which are in or comprises single casing, wherein said single casing includes a top transparent window and a front transparent window, wherein incoming light rays enter the front transparent window and are received by the convex primary reflective curved surfaces and reflected to the concave secondary reflective curved surfaces and thence exit through the top transparent window of the viewing device as an image or as images of the objects in front of the bicycle rider.

5. The combination of claim 4 wherein the casing is adjustably mounted on the handle bars with a vibration dampening mount.

6. The combination of claim 4 wherein the casing is waterproof.

7. An optical viewing device in combination with the handle bars of a bicycle upon which the device is mounted for enabling a bicycle rider observer when looking in a downward direction to view objects in front of him directly as they are rather than as reverse images and to broaden his field of view in both the horizontal and vertical directions, wherein the optical viewing device comprises a plurality of curved complementary reflective surfaces consisting of three convex primary and three concave secondary reflective surfaces which are in or comprise a single casing, wherein said single casing includes a top transparent window and a front transparent window, wherein incoming light rays enter the front transparent window and are received by the convex primary reflective curved surfaces and reflected to the concave secondary reflective curved surfaces and thence exit through the top transparent window of the viewing device as an image or as images of the objects in front of the bicycle rider.

8. The combination of claim 7 wherein the three convex primary reflective surfaces and the three concave reflective surfaces comprise three complementary sections wherein different reflective curvatures and curvature sizes can be used.

9. The combination of claim 7 wherein the casing is adjustably mounted on the handle bars with a vibration dampening mount.

10. The combination of claim 7 wherein the casing is waterproof.

11. An optical viewing device for enabling an observer to broaden his field of view in both the horizontal and vertical directions, and to view objects in front of him directly as they are rather than as reverse images, wherein the optical viewing device comprises a plurality of curved complementary reflective surfaces consisting of three convex primary and three concave secondary reflective surfaces which are in or comprise a single casing, wherein said single casing includes a top transparent window and a front transparent window, wherein incoming light rays enter the front transparent window and are received by the primary reflective curved surfaces and reflected to the secondary reflective curved surfaces and thence exit through the top transparent window of the viewing device as an image or as images of the objects in front of the observer.

12. An optical viewing device according to claim 11 wherein the three convex primary reflective surfaces and the three concave secondary reflective surfaces comprise three complementary sections wherein different reflective curvatures and curvatures sizes can be used.

* * * * *